(12) United States Patent
Heltoft et al.

(10) Patent No.: US 8,875,470 B2
(45) Date of Patent: Nov. 4, 2014

(54) ASSEMBLY RIG FOR ASSEMBLING A WIND TURBINE TOWER OR WIND TURBINE TOWER SECTIONS AND A RESPECTIVE METHOD

(75) Inventors: Lars Heltoft, Aalborg (DK); Henning Kjaer, Varde (DK); Arne Kryger, Langeskov (DK); Bent Juul Larsen, Outrup (DK)

(73) Assignees: Siemens Aktiengesellschaft, Munich (DE); Andresen Towers A/S, Langeskov (DK)

( * ) Notice: Subject to any disclaimer, the term of this patent is extended or adjusted under 35 U.S.C. 154(b) by 0 days.

(21) Appl. No.: 13/809,225

(22) PCT Filed: Jun. 3, 2011

(86) PCT No.: PCT/EP2011/059188
§ 371 (c)(1),
(2), (4) Date: Mar. 20, 2013

(87) PCT Pub. No.: WO2012/007226
PCT Pub. Date: Jan. 19, 2012

(65) Prior Publication Data
US 2013/0205711 A1    Aug. 15, 2013

(30) Foreign Application Priority Data
Jul. 13, 2010    (EP) .................................... 10007200

(51) Int. Cl.
*E04B 1/00*    (2006.01)
*E04G 1/18*    (2006.01)
*E04H 12/34*    (2006.01)
*F03D 1/00*    (2006.01)

(52) U.S. Cl.
CPC *E04H 12/34* (2013.01); *E04G 1/18* (2013.01); *Y02E 10/728* (2013.01); *F05B 2220/60* (2013.01); *F03D 1/001* (2013.01)
USPC ...... 52/745.17; 52/745.18; 52/121; 52/122.1; 52/123.1; 52/848

(58) Field of Classification Search
USPC ........... 52/745.17, 745.18, 121, 122.1, 123.1, 52/745.03, 745.04, 848, 651.01, 651.07; 212/233, 242, 251, 259, 326, 327, 270, 212/271, 296–298, 199–202
See application file for complete search history.

(56) References Cited

U.S. PATENT DOCUMENTS 8,584,429 B2 *    11/2013    Zavitz et al. ................ 52/745.18
2003/0183594 A1 *    10/2003    Torres Martinez ........... 212/196
(Continued)

FOREIGN PATENT DOCUMENTS

| CN | 101432216 A | 5/2009 |
|----|-------------|--------|
| CN | 101535582 A | 9/2009 |
| EP | 2006471 B | 12/2008 |
| WO | WO 2004083633 A | 9/2004 |

(Continued)

*Primary Examiner* — Mark Wendell

(57) ABSTRACT

An assembly rig for assembling a wind turbine tower or wind turbine tower sections is provided. The assembly rig includes a platform assembly having a vertically oriented mast and one or more substantially horizontally oriented booms which are connected to the vertically oriented mast that has a platform or a personnel basket. The assembly rig also includes a radial segment supporting assembly having a vertically oriented mast and one or more substantially horizontally oriented booms connected to the vertically oriented mast that has a segment holding device at its distal end. The assembly rig further includes a surface, for supporting and levelling the platform assembly and the radial segment supporting assembly. In one embodiment, the surface may be a ground support boom.

20 Claims, 4 Drawing Sheets

(56) References Cited

U.S. PATENT DOCUMENTS

| | | | |
|---|---|---|---|
| 2006/0213145 A1* | 9/2006 | Haller | 52/651.01 |
| 2010/0021278 A1* | 1/2010 | Stegemann et al. | 414/629 |
| 2010/0236161 A1* | 9/2010 | Livingston et al. | 52/125.2 |
| 2011/0079568 A1* | 4/2011 | Mau et al. | 212/296 |

FOREIGN PATENT DOCUMENTS

| | | |
|---|---|---|
| WO | WO 2007121538 A1 | 11/2007 |
| WO | WO 2009056969 A2 | 5/2009 |
| WO | WO 2009097858 A | 8/2009 |
| WO | WO 2010049313 A2 | 5/2010 |

* cited by examiner

ASSEMBLY RIG FOR ASSEMBLING A WIND TURBINE TOWER OR WIND TURBINE TOWER SECTIONS AND A RESPECTIVE METHOD

CROSS REFERENCE TO RELATED APPLICATIONS

This application is the US National Stage of International Application No. PCT/EP2011/059188, filed Jun. 3, 2011 and claims the benefit thereof. The International Application claims the benefits of European application No. 10007200.8 EP filed Jul. 13, 2010. All of the applications are incorporated by reference herein in their entirety.

FIELD OF INVENTION

The present invention relates to an assembly rig for assembling a wind turbine tower or wind turbine tower sections.

BACKGROUND OF INVENTION

From WO 2004/083633 A1 a sectioned wind turbine tower is known. In order to transport large size windmill towers the steel tower for a windmill comprises a number of cylindrical or tapered tower sections which are partly subdivided into two or more elongated shell segments. The shell segments combine into a complete tower section by means of vertical flanges which are connected by bolts. Sectioning is mainly done in order to achieve manageable tower units, both in relation to transportation and to lifting.

In EP 2 006 471 A1 it has been proposed to further split each section into tower segments. Each tower section is divided into segments which will be assembled by means of splice plate connections during installation. One advantage of this vertical segmentation is that the segments can be staged during a storage and transportation and therefore do not require as much space as for the tubular sectioned ones. Typically the tower segments have a polygonal cross-section.

In WO 2009/097858 A1 a tower element for a tower for a wind power plant is disclosed, where several tower elements with an outer surface and an inner surface are mounted on top of each other. The periphery of the tower element is made up of a number of segments provided with inwardly facing flanges at the longitudinal sides, the flanges being connected to corresponding flanges on laterally arranged segments. The individual segments are made with an overlap on the outer surface in the transverse joints and with a butt joint at the inwardly facing flanges.

In recent years the size of wind turbine towers has increased substantially which requires an assembly rig so that wind turbine towers can be assembled on an installation side quickly and safely.

SUMMARY OF INVENTION

It is therefore an object of the present invention to provide an assembly rig for assembling a wind turbine tower or wind turbine tower sections quicker and easier.

According to the present invention this object is achieved in the above defined assembly rig in that it comprises a platform assembly comprising a vertically oriented mast and one or more substantially horizontally oriented booms which are connected to the vertically oriented mast comprising a platform or a personnel basket; a radial segment supporting assembly comprising a vertically oriented mast and one or more substantially horizontally oriented booms connected to the vertically oriented mast comprising a segment holding means at its distal end; and a surface, in particular a ground support boom for supporting and leveling said platform assembly and said radial segment supporting assembly.

The main concept of the inventive assembly rig comprises three main components, namely a central platform assembly which is prepared for holding and correctly positioning e.g. working personnel inside the circumference of the wind turbine tower so that the personnel will be able to do assembly work inside the tower such as mounting bolted connections between adjacent tower sections. The second component is a radial segment supporting assembly which is prepared for receiving, holding and correctly positioning a first tower segment of a tower or a tower section to be assembled and prepared for holding partly assembled towers or tower sections comprising two or more tower segments. The third component is a ground support boom which is prepared for supporting and leveling said platform assembly, said radial segment supporting assembly and the tower or tower section under assembling.

According to a further development of the inventive assembly rig the at least one boom of the platform assembly can be moved and secured along its longitudinal axis and also along the longitudinal axis of the mast. Preferably the boom can be moved and secured to various or any position along its longitudinal axis, i.e. in a substantially horizontal direction. This adjustment allows to perform work at any desired position of a wind turbine tower or wind turbine tower sections.

In the inventive assembly rig it can be envisaged that an industrial robot is disposed on the platform of the platform assembly. Such an industrial robot may be utilised for carrying out assembly steps automatically. Examples for automatic assembly steps are welding, screwing or riveting of wind turbine tower sections or other subcomponents.

In the inventive assembly rig the position of the at least one boom can be adjusted manually or electrically, in particular by the use of one or more electrical motors. The use of motors minimises manual work so that the boom can be brought into any desired position. It is possible that the boom can be positioned continuously or as an alternative at discrete pre-established points.

In order to facilitate the adjustment of the at least one boom it can be envisaged that the adjustment can be controlled from the ground support boom or from ground level. Another possibility is that a remote control is used for the adjustment of a boom.

The boom of the inventive assembly rig may be telescopic such that plural telescopic segments can be slid into to each other.

For large and/or heavy wind turbine tower sections or other components the radial segment supporting assembly may comprise crane means for lifting a tower segment. With the crane means a tower segment can be lifted from ground level to the top of a wind turbine tower.

In the inventive assembly rig the radial segment supporting assembly may comprise one or more substantially horizontally oriented booms which are connected to the vertically oriented mast comprising the central platform assembly. In this embodiment the radial segment supporting assembly and the central platform assembly are combined so that only one mast is required.

According to a further development of the invention the ground support boom assembly may comprise a plurality of radially extending legs. The ground support boom serves as a support for the platform assembly and the radial segment supporting assembly, further the ground support boom enables leveling of the other components of the inventive assembly rig.

Preferably the ground support boom assembly can be supported by a plurality of jacks for adjusting the height. By the use of the jacks the height can be adapted to any ground.

In the inventive assembly rig a leg may comprise a segment holding means for positioning and holding a tower section in place. Accordingly all tower sections are fixed by a segment holding means of the ground support boom assembly.

It is also within the scope of the invention that the surface is a truck trailer. When a truck trailer is used as surface the installation can be done faster and easier.

The invention further relates to a method for assembling a wind turbine tower or a wind turbine tower section consisting of a plurality of longitudinal tower segments. The inventive method comprises the following steps:

a) placing a first tower segment on a surface, in particular on a ground support boom;
b) positioning and holding the lower end of the tower segment by a segment holding means;
c) holding and positioning the upper end of the tower segment by a segment holding means;
d) placing and positioning a further tower segment adjacent to the previously positioned tower segment; and
e) connecting the two adjacent tower segments to each other.

BRIEF DESCRIPTION OF THE DRAWINGS

The invention and its underlying principle will be better understood when consideration is given to the following detailed description of preferred embodiments.

In the accompanying drawings.

DETAILED DESCRIPTION OF INVENTION

Figure 1:
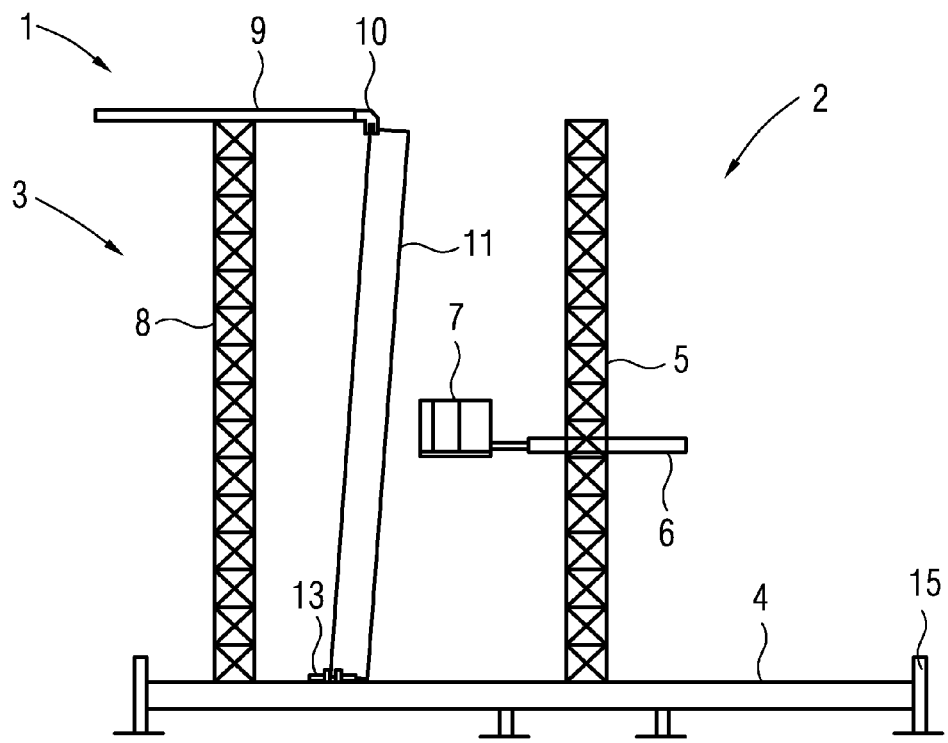
FIG. 1 shows a schematic view of an inventive assembly rig.

FIG. 1 is a schematic view of an assembly rig 1 comprising a platform assembly 2, a radial segment supporting assembly 3 and a surface in the form of a ground support boom 4. Platform assembly 2 comprises a vertically oriented mast 5 and a boom 6 which is horizontally oriented and connected to the vertically oriented mast 5. The boom 6 comprises a personnel basket 7. The central platform assembly 2 is used for holding and correctly positioning working personnel inside the circumference of a wind turbine tower so that the personnel will be able to do assembly work inside or outside the tower such as mounting bolted connections between adjacent tower sections. In addition other assembly steps like welding can be performed from the personnel basket 7. In other embodiments the boom 6 can comprise an industrial robot (not shown) at its distal end. In FIG. 1 only one boom 6 is depicted whereas in other embodiments several booms 6 can be present.

The boom 6 can be moved and secured to any position along its longitudinal axis, i.e. in a substantially horizontal direction and also to any position along the longitudinal axis of the mast 5 in a substantially vertical direction. Accordingly working personnel in the basket 7 can be placed to any desired position near a tower or a tower segment independent of the diameter of a tower or tower section under construction. The task of the working personnel in the personnel basket 7 and/or an industrial robot is mainly to establish bolted connections between adjacent segments of a wind turbine tower. The boom 6 can be adjusted by the use of an electrical motor. The platform assembly 2 further comprises outlets for tools and equipment used by the working personnel or a robot. In the present embodiment electrical, pneumatic and hydraulic outlets are provided. The personnel basket 7 comprises holes for tools. Safety means are provided at the platform assembly 2 for ensuring the safety of the working personnel. Safety means comprise hooks whereto lifelines can be attached, shields and non-slip coverings of the surfaces of the personnel basket 7. The position of the personnel basket 7 can be controlled from the personnel basket 7 or from a ground position.

Further the assembly rig 1 comprises the radial segment supporting assembly 3. The radial segment supporting assembly 3 comprises two sub-parts, namely a vertical oriented mast 8 and a horizontal oriented boom 9 which is connected to the mast 8 at the top mast end. The boom 9 further comprises a segment holding means 10 at its distal end towards the centre of a tower section 11. The segment holding means 10 is formed so that it securely maintains the top of the tower section 11. The boom 9 can be moved and secured to any position along its longitudinal axis in horizontal direction. The position is also dependent on the angle relative to the vertical axis the tower section 11 to take. Hereby the segment holding means 10 can be established at any desired position which is dependent on which diameter the actual tower or tower section 11 is to be constructed with. When the segment holding means 10 is established relatively close to the platform assembly 2 the diameter of the tower or tower section 11 to be constructed is small, whereas if the segment holding means 10 is established relatively remote to the platform assembly 2 the diameter of the tower or the tower section 11 to be constructed is large.

Similarly at the boom 6 the adjustment of the position of the boom 9 can be done manually or electrically by the use of one or more electrical motors. The position can be controlled from the personnel basket 7 of the platform assembly 2 and/or from ground level. The possible position of the boom 9 may be at any continuous point or alternatively at a number of discrete pre-established points.

The height of the vertically oriented mast 8 fits the height of the tower or tower section 11 to be assembled in the assembly rig 1. The boom 9 is connected to the mast 8 substantially at the top of the mast 8 whereas for other embodiments the boom may be connected at any desired vertical point on the mast 8 so that it can be adjusted to the height of the tower or tower section to be assembled. The segment holding means 10 holds the tower section 11 or a tower segment at the top or at some other point along the longitudinal extension to where the segment holding means 10 can be secured. The tower section 11 comprises means which can engage with the segment holding means 10 in order to establish a secure connection between the two.

Further the assembly rig 1 comprises a ground support boom 4 for supporting and leveling said platform assembly 2 and said radial segment supporting assembly 3. The ground support boom will be described in detail with regard to FIGS. 3 and 4.

Figure 2:
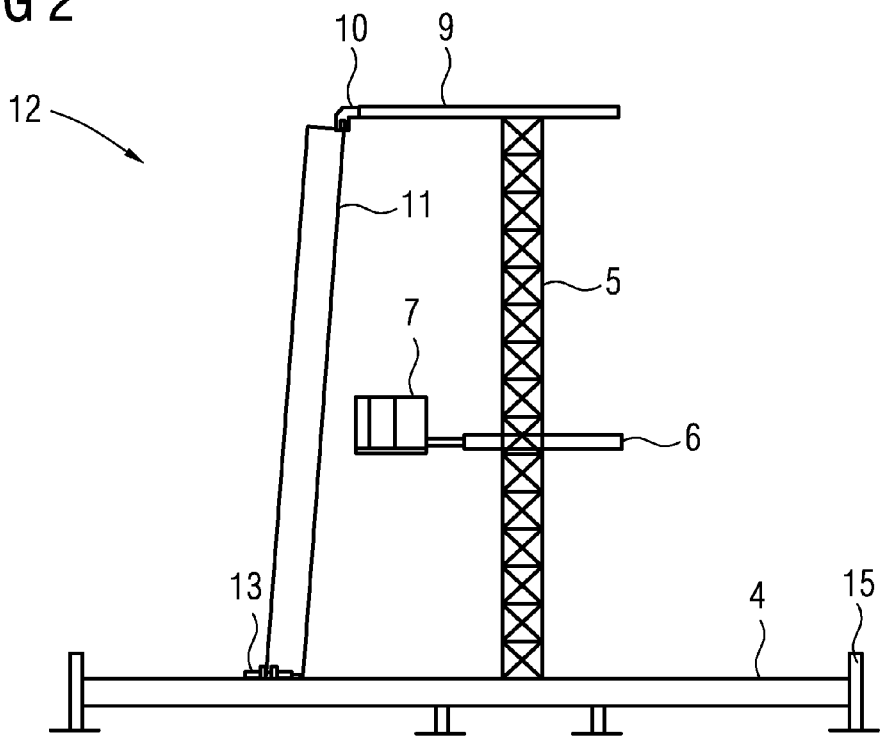
FIG. 2 shows a schematic view of a second embodiment of an inventive assembly rig.

FIG. 2 shows another embodiment of an assembly rig 12, whereby a platform assembly comprising a personnel basket 7 and radial segment supporting assembly comprising the boom 9 are combined. A mast 5 supports a boom 6 with the personnel basket 7, on top of the mast 5 the boom 9 comprising a segment holding means 10 is disposed. A tower section 11 engages with the tower section 11. Another segment holding means 13 is provided at the ground support boom 4 for fixing the lower end of tower section 11. The different components of the assembly rig 12 basically work in the same way as is described with regard to FIG. 1.

Figure 3:
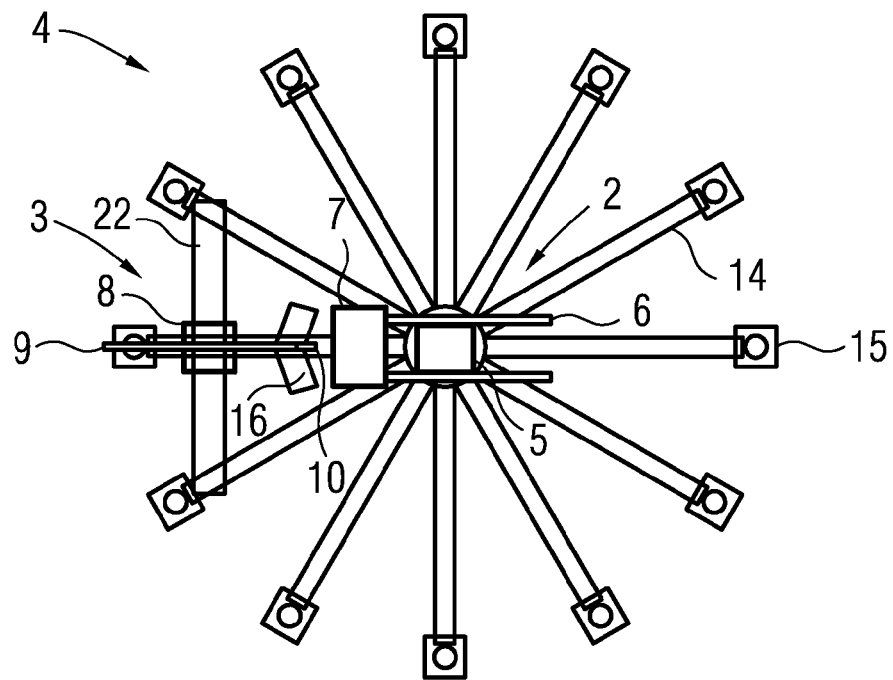
FIG. 3 is a plan view of a ground support boom of the inventive assembly rig.
Figure 4:
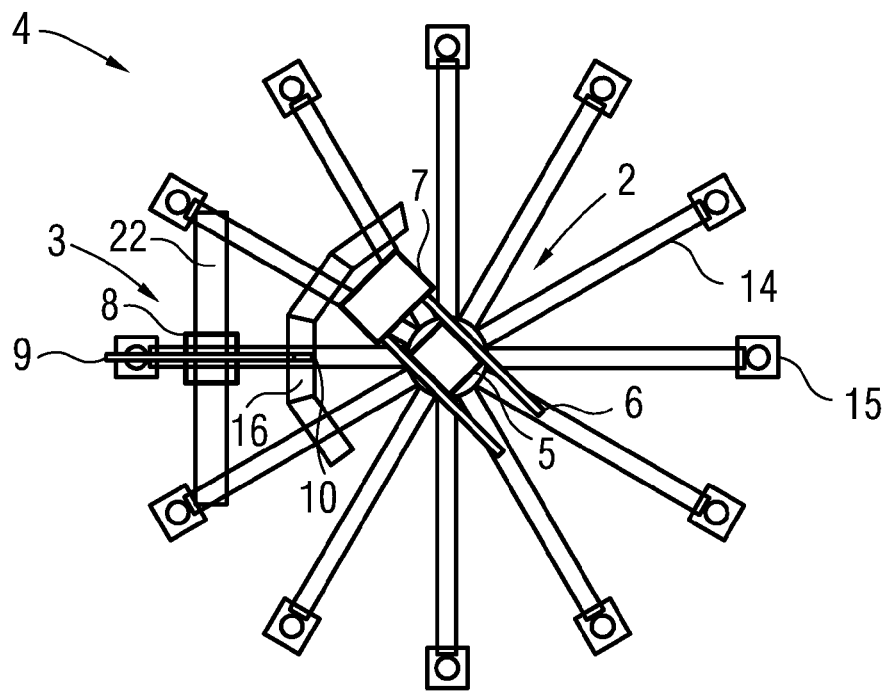
FIG. 4 is another plan view of a ground support boom.

FIGS. 3 and 4 are plan views of the ground support boom 4. As can be seen the ground support boom 4 comprises a plurality of legs 14 which extend from the centre of the ground support boom 4 radially. The function of the legs 14 is to keep the assembly rig substantially rigid and to support each segment of a tower section to be installed. As can be seen in particular in FIG. 4 the number of legs 14 is equal to the number of segments comprised in one tower or a tower section so that each leg 14 supports one segment under installation. Further the ground support boom 4 has the function of supporting and leveling the platform assembly 2 and the radial segment supporting assembly 3. In FIGS. 1 and 2 one can see that the legs 14 of the ground support boom 14 are supported by a plurality of jacks 15 which comprise means so that the height of the ground support boom 4 can be adjusted so that it can be leveled correctly.

Mast 5 of the platform assembly 2 is disposed in the centre of the ground support boom 4, the mast 5 carrying the boom 6 with the personnel basket 7. The personnel basket 7 can be moved into the vicinity of a tower segment 16 so that plural tower segments 16 can be assembled in circumferential direction. From the personnel basket 7 the tower segments 16 are assembled with nuts and bolts, rivets or by welding.

The radial segment supporting assembly 3 is also disposed above the ground support boom 4. Mast 8 with boom 9 is supported by a girder 22, which is placed upon legs 14 of the ground support boom 4. The segment holding means 10 at the distal end of boom 9 fixes the tower segments 16.

It is advantageous that an initial tower segment 16 can be positioned and held in an accurate position in all three directions and with the correct angle from where the further tower segments can be connected to this initial tower segment 16. Through the correct positioning of the first tower segment 16 correct positions and angles for all other tower segments are achieved. The assembly rig as shown in FIGS. 3 and 4 ensures a good working environment for the workers as the personnel basket 7 can be positioned in optimal positions in relation to the work to be done.

Figure 5:
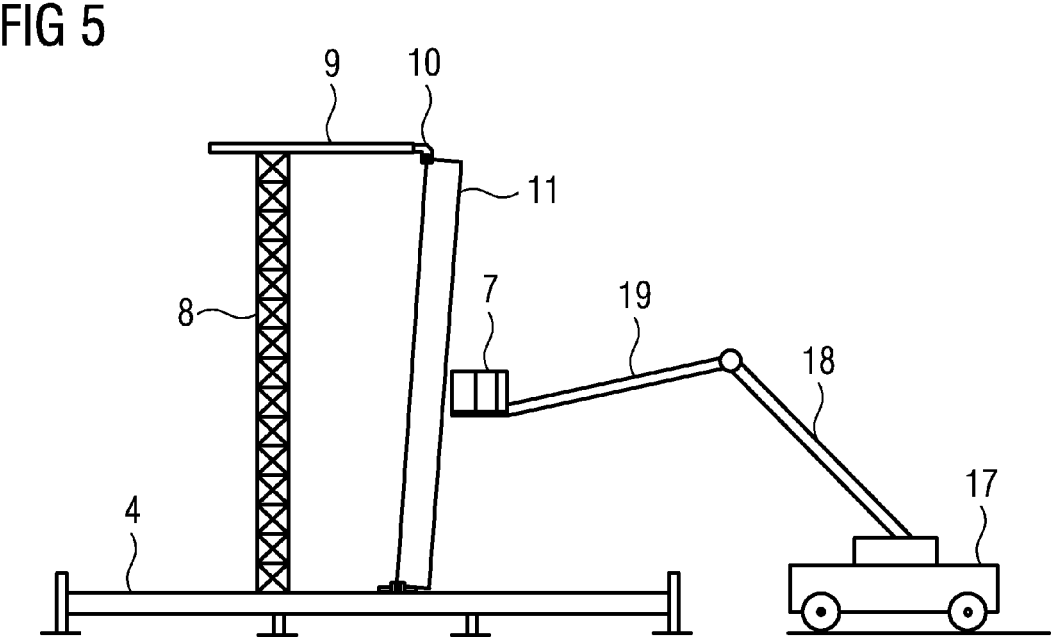
FIG. 5 shows the inventive assembly rig and a mobile lift.

FIG. 5 shows an embodiment with a radial segment supporting assembly 3, a ground support boom 4 and a platform assembly in the form of a separate mobile lift 17. The radial segment supporting assembly 3 with boom 9 and segment holding means 10 is identical to the one shown in FIG. 1. In order to perform work on a tower section 11 which is fixed by the segment holding means 10 the mobile lift 17 is used as a platform assembly. The mobile lift 17 comprises two articulated mast sections 18, 19 so that any desired position along tower section 11 can be reached.

Figure 6:
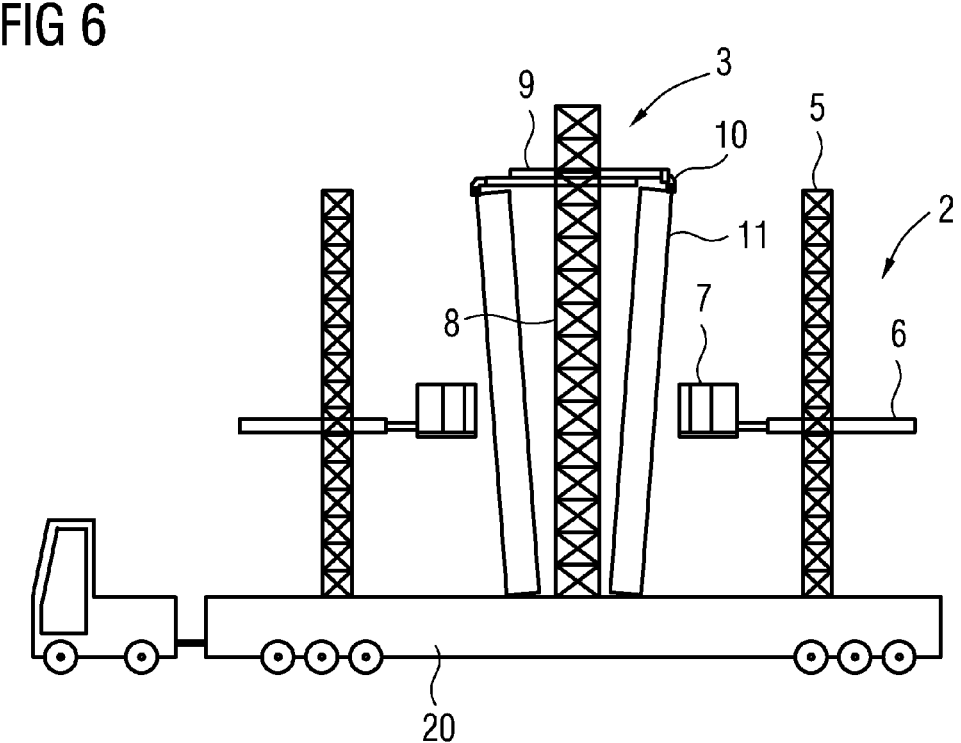
FIG. 6 shows an assembly rig where the surface is a truck trailer.
Figure 7:
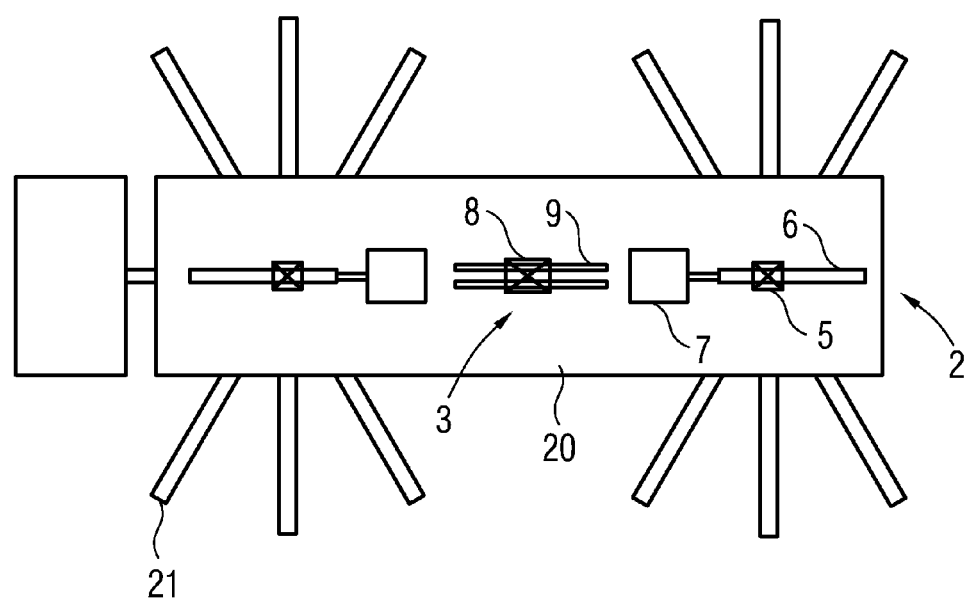
FIG. 7 is a plan view of the assembly rig of FIG. 6.

FIGS. 6 and 7 show another embodiment of an assembly rig where the surface is a truck trailer. FIG. 7 is a plan view of the embodiment of FIG. 6. A truck trailer 20 is used as surface comprising legs 21 disposed in radial direction. The truck trailer 20 carries two platform assemblies 2 each comprising a mast 5, a boom 6 and a personnel basket 7. Further the truck trailer 20 carries a radial segment supporting assembly 3 with a mast 8 and two booms 9 with segment holding means 10.

As can be seen in FIGS. 6 and 7 the ground support boom 4 is basically substituted by the surface of the truck trailer 20 on the installation site so as to achieve a desired positioning and leveling of the assembly rig. The truck trailer 20 comprises in total three vertically oriented masts 5, 8 which are attached to the truck trailer 20 at their lower end. The radial segment support assembly 3 can be utilised for one or more central platform assemblies 2. This arrangement is also applicable for a "ground installation", without a truck trailer, similar to the embodiments of FIGS. 1 and 2.

It is pointed out that all technical features, components and parts of the different.

The invention claimed is:

1. An assembly rig for assembling a wind turbine tower or wind turbine tower sections, comprising:
    a platform assembly comprising a vertically oriented mast and one or more substantially horizontally oriented booms which are connected to the vertically oriented mast comprising a platform or a personnel basket;
    a radial segment supporting assembly comprising a vertically oriented mast and one or more substantially horizontally oriented booms connected to the vertically oriented mast comprising a segment holding device at its distal end; and
    a surface for supporting and levelling said platform assembly and said radial segment supporting assembly.

2. The assembly rig according to claim 1, wherein the surface is a ground support boom.

3. The assembly rig according to claim 1, wherein the at least one boom of the platform assembly can be moved and secured along its longitudinal axis and also along the longitudinal axis of the mast.

4. The assembly rig according to claim 1, wherein an industrial robot is disposed on the platform of the platform assembly.

5. The assembly rig according to claim 1, wherein the at least one boom of the radial segment supporting assembly can be moved and secured along its longitudinal axis.

6. The assembly rig according to claim 5, wherein the position of the at least one boom of the radial segment supporting assembly can be adjusted manually or electrically.

7. The assembly rig according to claim 5, wherein the boom of the radial segment supporting assembly can be positioned continuously or at discrete pre-established points.

8. The assembly rig according to claim 5, wherein the adjustment of the longitudinal position of the at least one boom of the radial segment supporting assembly can be controlled from the ground support boom or from ground level.

9. The assembly rig according to claim 1, wherein the boom of the radial segment supporting assembly is telescopic.

10. The assembly rig according to claim 1, wherein the radial segment supporting assembly comprises a crane for lifting a tower section.

11. The assembly rig according to claim 1, wherein the radial segment supporting assembly comprises one or more substantially horizontally oriented booms which are connected to the vertically oriented mast comprising the platform assembly.

12. The assembly rig according to claim 2, wherein the ground support boom assembly comprises a plurality of radially extending legs.

13. The assembly rig according to claim 12, wherein the ground support boom assembly is supported by a plurality of jacks for adjusting the height.

14. The assembly rig according to claim 12, wherein a leg comprises a segment holding device for positioning and holding a tower section in place.

15. The assembly rig according to claim 2, wherein the ground support boom is a truck trailer.

16. A method for assembling a wind turbine tower or a wind turbine tower section comprising a plurality of longitudinal tower segments, the method comprising:

placing a first tower segment on a surface which supports and levels a platform assembly and a radial segment supporting assembly, the platform assembly comprising a vertically oriented mast and one or more substantially horizontally oriented booms which are connected to the vertically oriented mast comprising a platform or a personnel basket, the radial segment supporting assembly comprising a vertically oriented mast and one or more substantially horizontally oriented booms connected to the vertically oriented mast comprising a segment holding device at its distal end;

positioning and holding the lower end of the tower segment by the segment holding device;

holding and positioning the upper end of the tower segment by the segment holding device;

placing and positioning a further tower segment adjacent to the previously positioned tower segment; and connecting the two adjacent tower segments to each other.

17. The method according to claim 16, comprising moving the at least one boom of the platform assembly along the longitudinal axis of the mast.

18. The method according to claim 16, comprising moving at least one boom of the radial segment supporting assembly along its longitudinal axis.

19. The method according to claim 16, comprising adjusting a position of the at least one boom of the radial segment supporting assembly.

20. The method according to claim 19, wherein the positioned is adjusted at discrete pre-established points.

\* \* \* \* \*